United States Patent [19]

Adami

[11] Patent Number: 4,588,913
[45] Date of Patent: May 13, 1986

[54] STEPPING MOTOR LINEAR ACTUATOR WITH INTERNAL CLUTCH

[75] Inventor: Hans J. Adami, Hamburg, Fed. Rep. of Germany

[73] Assignee: U.S. Philips Corporation, New York, N.Y.

[21] Appl. No.: 500,676

[22] Filed: Jun. 3, 1983

[30] Foreign Application Priority Data

Jun. 9, 1982 [DE] Fed. Rep. of Germany ....... 3221792

[51] Int. Cl.<sup>4</sup> ............................ H02K 7/10; F16D 7/02
[52] U.S. Cl. .................................... 310/78; 310/49 R; 310/80; 464/30
[58] Field of Search .................... 310/75 P, 76, 78, 80, 310/83, 100, 49; 384/97, 125; 464/8, 9, 30

[56] References Cited

U.S. PATENT DOCUMENTS

| | | | |
|---|---|---|---|
| 2,560,133 | 7/1951 | Schroeter | 384/125 |
| 2,643,614 | 6/1953 | Rosenkrans | 103/87 |
| 2,978,621 | 4/1961 | Martinek | 310/83 |
| 3,406,583 | 10/1968 | Baier | 464/30 |
| 3,612,376 | 10/1971 | Johnson | 226/194 |
| 4,107,559 | 8/1978 | Patel | 310/49 |
| 4,292,557 | 9/1981 | Kishi | 310/78 |
| 4,397,380 | 8/1983 | Yew | 310/78 |

FOREIGN PATENT DOCUMENTS

| | | | |
|---|---|---|---|
| 586814 | 10/1933 | Fed. Rep. of Germany | 310/78 |
| 2915171 | 10/1980 | Fed. Rep. of Germany | . |
| 3108372 | 1/1982 | Fed. Rep. of Germany | . |
| 1220004 | 5/1960 | France | 464/30 |
| 2079907 | 11/1971 | France | . |
| 633446 | 12/1949 | United Kingdom | 310/78 |
| 876808 | 9/1961 | United Kingdom | 310/78 |
| 2097197 | 10/1982 | United Kingdom | . |

*Primary Examiner*—Patrick Salce
*Assistant Examiner*—D. L. Rebsch
*Attorney, Agent, or Firm*—David R. Treacy

[57] ABSTRACT

A linear actuator having a rotor sleeve coupled through a thread to an output spindle, and a rotor-magnet sleeve surrounding the rotor sleeve for driving it. The rotor is maintained in step with the driving circuit even though the output spindle may have struck a stop, by providing a slip clutch between the rotor-magnet sleeve and the rotor sleeve.

9 Claims, 1 Drawing Figure

U.S. Patent   May 13, 1986   4,588,913
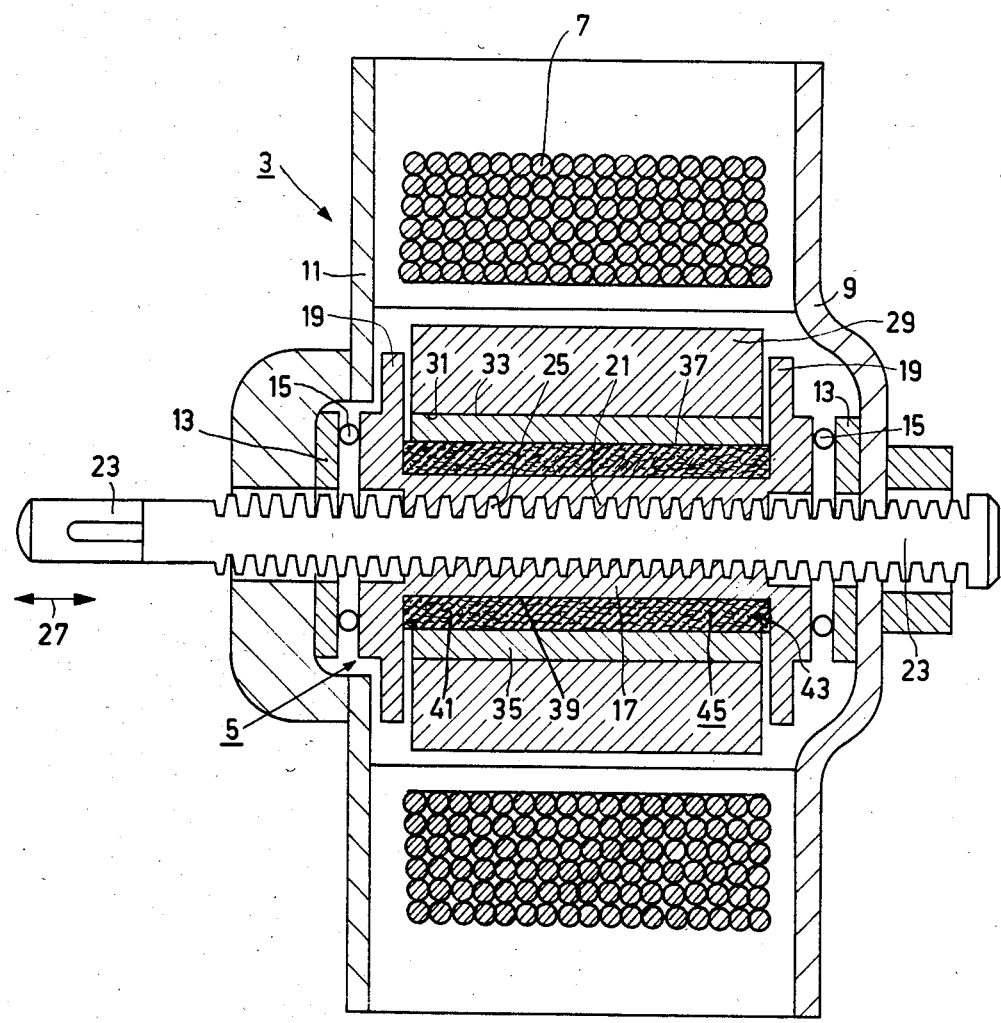

STEPPING MOTOR LINEAR ACTUATOR WITH INTERNAL CLUTCH

BACKGROUND OF THE INVENTION

The invention relates to a linear actuator incorporating a stepping motor having a rotor which comprises a rotor shaft and a rotor-magnet sleeve, the rotor-magnet sleeve surrounding to the rotor shaft and imparting rotation to the rotor shaft.

Such stepping motors are generally known (Valvo UB of Philips GmbH, type no. 9904 112 27101).

Stepping motors are used for rotary and linear movements. In stepping motors for linear movements, the customary rotor shaft is replaced by a rotor shaft with an internal helical thread which cooperates with a threaded spindle. During rotation of the rotor shaft the threaded spindle is then reciprocated axially. Such stepping motors for linear movements are commonly known as actuators.

Generally, stepping motors must be started in a specific initial position. This initial position is detected by external means such as optical switches, light barriers or magnetic indicators.

These detection methods cannot be employed in the type of linear actuator described above, because the indicators used do not produce a satisfactory response for a displacement of the order of magnitude of 0.05 mm per step. Therefore, it is not possible to obtain a well-defined initial position in the case of small displacements.

These linear actuators have another disadvantage. They cannot cooperate with a mechanical stop. If this is required, it is found that the rotor may jump back, for example two steps, from the mechanical stop, so that the rotor magnet gets out of step—that is, the rotor position does not correspond to the stop position and the initial position is not correct when the motor is started again.

Until now these properties have prohibited use of rotary-step-drive linear actuators which must cooperate with a specific stop and which can perform accurate steps starting from this step.

SUMMARY OF THE INVENTION

It is an object of the invention to provide a linear actuator whose rotor can cooperate accurately with a stop, and which can be started from the initial position defined by this stop to perform exact steps.

According to the invention this object is achieved in that a slip coupling is arranged between the rotor shaft and the rotor-magnet sleeve.

The arrangement of the slip coupling between the rotor-magnet sleeve and the rotor shaft allows the rotor magnet to rotate, while the rotor shaft is stopped by the stop which defines the initial position. In this stop or initial position the rotor can be started to perform exactly defined steps.

In a further embodiment of the invention a coupling sleeve is arranged on the inner wall of the rotor-magnet sleeve. This coupling sleeve forms a wear-resistant part between the rotor magnet and the rotor shaft.

In a further embodiment of the invention the slip coupling comprises a felt-like coupling sleeve arranged between the rotor shaft and the rotor-magnet sleeve. Alternatively it is possible that the slip coupling comprises a layer of an adhesive grease which fills a coupling gap between the rotor shaft and the rotor-magnet sleeve. The adhesive grease may be based on highly-viscous oils.

In order to ensure that the rotor-magnet sleeve can rotate to a satisfactory extent relative to the rotor shaft the torque of the slip coupling must be such that it is slightly smaller than the maximum motor torque. The wear to which the slip coupling is subjected is negligible because the slip coupling is used only briefly before the motor is switched on, and briefly after it is switched off. During the remainder of the operating time, the rotor shaft and the rotor-magnet sleeve are substantially rigidly coupled to each other.

Embodiments of the invention will be described in more detail, by way of example, with reference to the drawing.

BRIEF DESCRIPTION OF THE DRAWING

The sole FIGURE is a side view, partly in section, of a linear actuator according to the invention.

DESCRIPTION OF THE PREFERRED EMBODIMENTS

The drawing shows a stepping motor comprising a schematically shown stator 3 and a rotor 5. The stator 3 comprises the stator coils 7 and the end plates 9 and 11 on the axial coil ends. The rotor shaft is rotatably journalled on the end plates 9 and 11 by means of bearing plates 13 and ball-bearings 15.

The ball bearings 15 journal a rotor sleeve 17, which is provided with flanged discs 19. The rotor sleeve 17 is provided with an internal helical thread 21.

A threaded spindle 23 cooperates with the internal helical thread 21 of the rotor sleeve 17, the thread 25 of the spindle engaging the internal helical thread of the rotor sleeve 17. As the rotor 5, and consequently the rotor sleeve 17, rotates the threaded spindle 23 is moved in one of the directions indicated by the double arrow 27 in conformity with the direction of rotation of rotor 5. This movement is performed in steps which correspond to the stepwise rotation of the rotor 5, the motor being constructed as a stepping motor.

The rotor 5 also comprises a permanently magnetized rotor-magnet sleeve 29, whose inner wall 31 cooperates with the outer wall 33 of a coupling sleeve 35. The coupling sleeve 35 and the rotor-magnet sleeve are rigidly connected to each other. The rotor-magnet sleeve is magnetized in conformity with the motor specification and the coupling sleeve may for example be made of brass or bronze.

Between the inner wall 37 of the coupling sleeve 35 and the outer wall 39 of the rotor sleeve 17 a lining 41 is arranged. This lining may for example be felt. However, it is alternatively possible to fill the gap 43 between the inner wall of the coupling sleeve 37 and the outer wall of the rotor sleeve with a layer of an adhesive grease. A suitable grease is for example an adhesive grease based on highly viscous oils.

A slip coupling 45 is formed by the lining or the grease 41, the inner wall 37 of the coupling sleeve 35 and the outer wall of the rotor sleeve 17. The torque of the slip coupling 45 is adjusted so that it is slightly smaller than the maximum motor torque. By developing the maximum motor torque the rotor magnet is rotated by the stator coils in conformity with the energizing pulses, even if the threaded spindle 23 has for example run against a stop and cannot move any further. The threaded spindle is not withdrawn from the stop until energizing pulses of the opposite direction are applied to the stator coils, the movements away from the stop being divided accurately into the steps specified for this motor.

Thus, the slip coupling allows the threaded spindle of an actuator to engage accurately with a stop and to be restarted from this position with the specified steps. In this way specific zero positions can be defined in a simple manner.

What is claimed is:

1. A linear actuator comprising
    a stepping motor stator,
    a rotor sleeve having a helical thread, mounted to be rotatable with respect to said stator,
    a threaded spindle engaging said helical thread and mounted to be axially movable with respect to said stator, and
    a rotor-magnet sleeve surrounding said rotor sleeve for imparting rotation to said rotor sleeve,
    characterized by comprising a slip coupling arranged between said rotor sleeve and said rotor-magnet sleeve and supporting said rotor-magnet sleeve with respect to said rotor sleeve, said slip coupling having a torque less than the maximum stepping motor torque,
    whereby engagement of said spindle with a stop does not cause the rotor-magnet sleeve to get out of step.

2. An actuator as claimed in claim 1, characterized in that said rotor-magnet sleeve has an inner wall, and the actuator comprises a coupling sleeve made of a material different from said rotor-magnet sleeve, arranged on said inner wall, and has a coupling sleeve inner wall which is an outer clutch surface.

3. An actuator as claimed in claim 2, characterized in that said slip coupling comprises a felt coupling sleeve arranged between the rotor sleeve and the coupling sleeve inner wall, said coupling being dimensioned and arranged to have a slipping torque slightly smaller than the maximum motor torque.

4. An actuator as claimed in claim 2, characterized in that said slip coupling comprises a layer of an adhesive grease which fills a coupling gap between the rotor sleeve and said coupling sleeve inner wall, said coupling being dimensioned and arranged to have a slipping torque slightly smaller than the maximum motor torque.

5. An actuator as claimed in claim 4, characterized in that said adhesive grease is based on highly viscous oils.

6. An actuator as claimed in claim 1, characterized in that said slip coupling comprises a layer of an adhesive grease, said rotor-magnet sleeve being supported through said grease.

7. An actuator as claimed in claim 6, characterized in that said adhesive grease is based on highly viscous oils.

8. An actuator as claimed in claim 1, characterized in that said slip coupling comprises a felt coupling sleeve, said rotor-magnet sleeve being supported through said felt coupling sleeve.

9. An actuator as claimed in claim 1, characterized in that said coupling is dimensioned and arranged to have a slipping torque slightly smaller than the maximum motor torque.

* * * * *